INVENTOR
HENRY G. MAH
BY
ATTORNEY

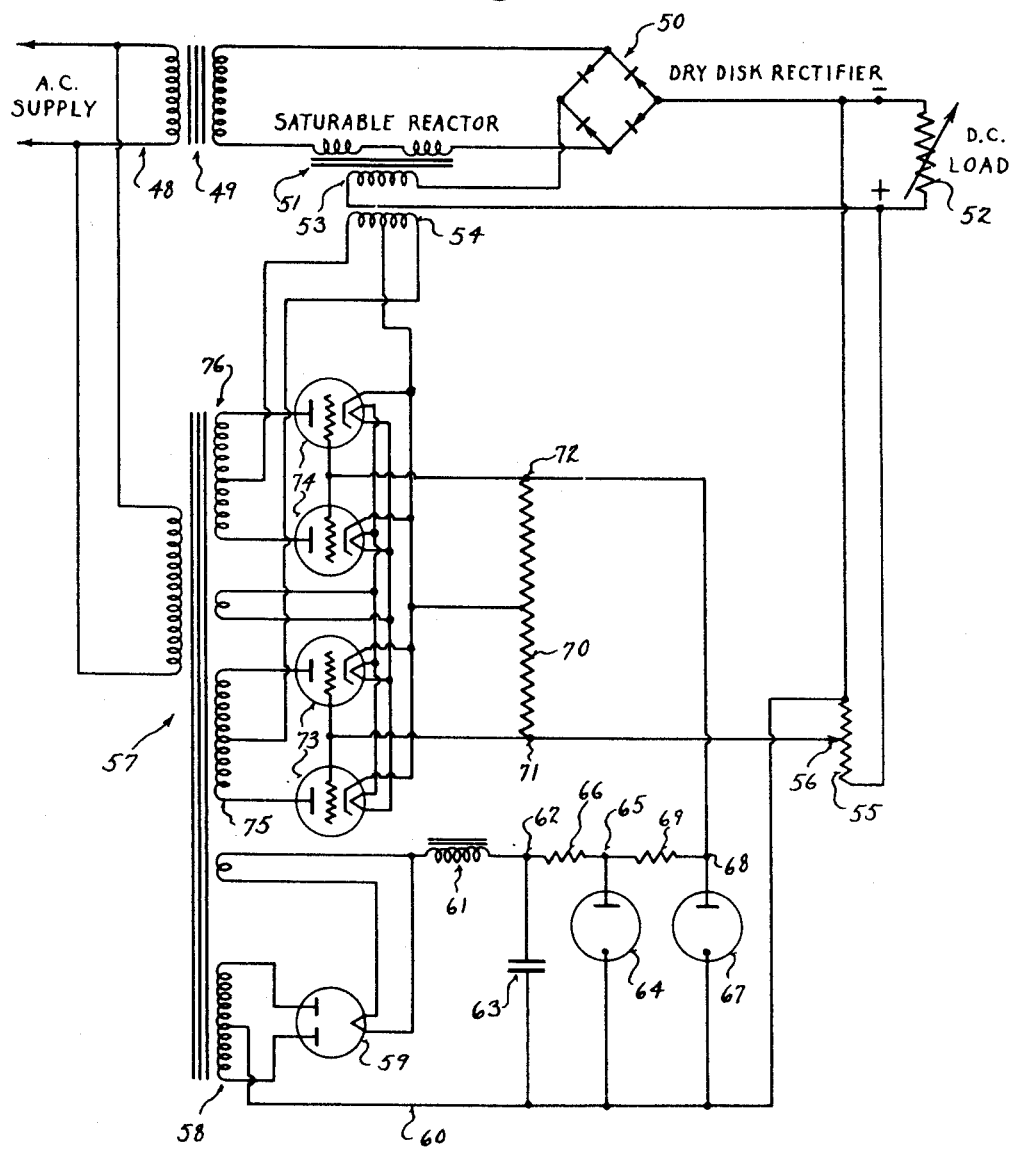

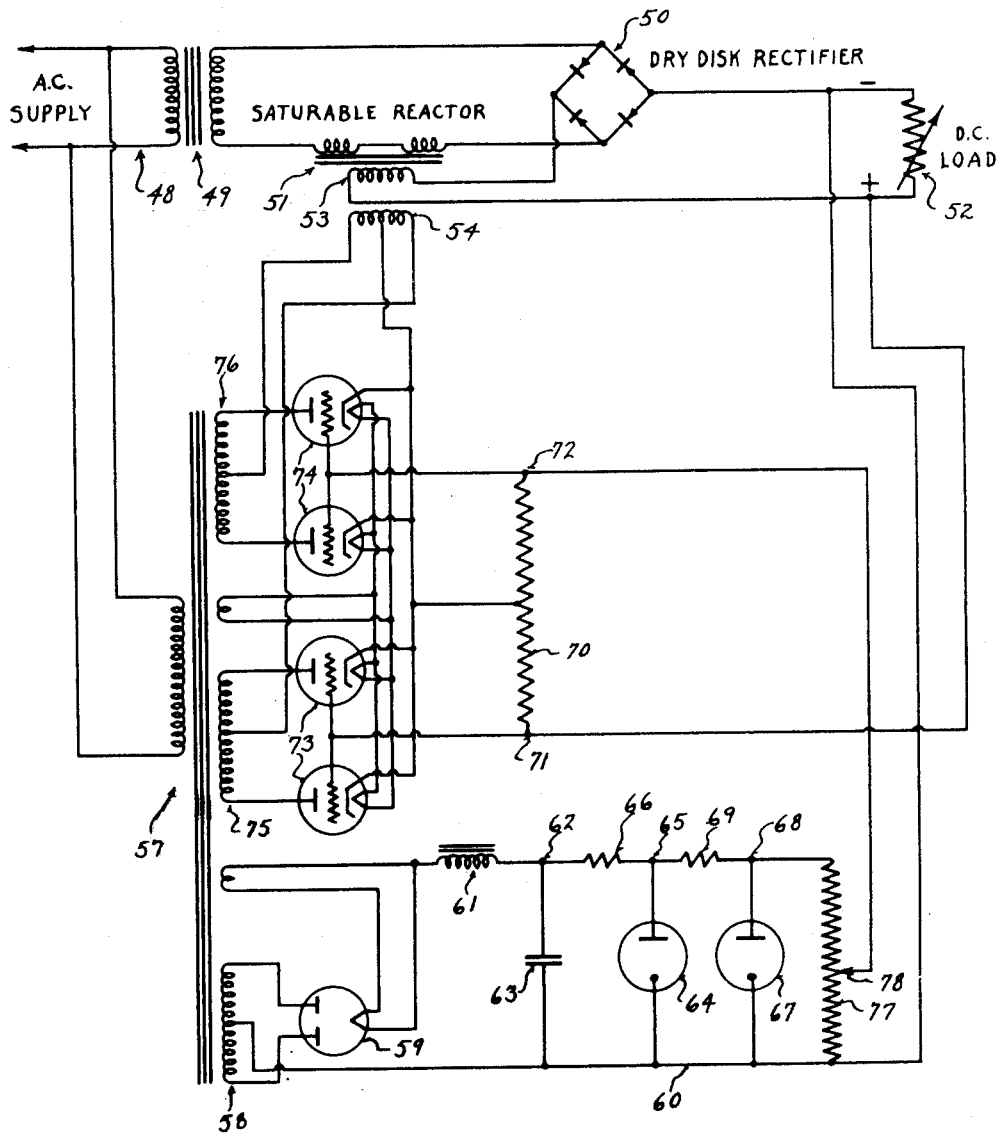

Patented Apr. 11, 1950

2,503,880

UNITED STATES PATENT OFFICE 2,503,880

SYSTEM OF REGULATION

Henry G. Mah, Toronto, Ontario, Canada, assignor to McGraw Electric Company, a corporation of Delaware Application March 30, 1946, Serial No. 658,407

4 Claims. (Cl. 321—25)

This invention relates to a system of regulation.

Objects of this invention are to provide a system of regulation for maintaining a constant potential across a load irrespective of variations in the value of the load on the one hand, and irrespective of variations in the supply voltage for the system.

In greater detail, further objects are to provide a system of regulation for maintaining a constant direct current voltage at a load where the direct current is supplied from an alternating current supply through a rectifier to the load.

Further objects are to provide a voltage regulation system in which electronic voltage regulator tubes are employed either to directly control the action of a saturable reactor or to control the action of the saturable reactor through the agency of other electronic devices such as thyratrons or other suitable devices, thus securing a substantially instantaneous adjustment of the saturable reactor in response to variations of either the load or the supply voltage.

Further objects are to provide a voltage regulation system for maintaining constant voltage at a direct current load supplied from an alternating current source through a rectifier by controlling a saturable reactor on the alternating current side of the rectifier, with the saturable reactor arranged to respond to both the voltage at the direct current load and the current passing to the direct current load, and to arrange the current responsive winding of the saturable reactor so that it acts as a magnetizing biasing means for the saturable reactor and to correlate it with a voltage responsive means so that the voltage responsive means either increases or decreases such magnetic bias to thereby maintain a constant voltage at the direct current load.

Embodiments of the invention are shown in the accompanying drawings, in which:

Figure 3 is a diagrammatic view showing the system of control where a fraction of the load voltage is balanced against a separate constant voltage and the difference used to control a saturable reactor through the agency of electronic devices, such system being especially applicable where the load voltage is relatively high.

Figure 4 is a diagrammatic view showing the system of control where the load voltage is balanced against a fraction of a separate constant voltage and the difference used to control a saturable reactor through the agency of electronic devices, such system being especially applicable where the load voltage is relatively low.

Figure 1:
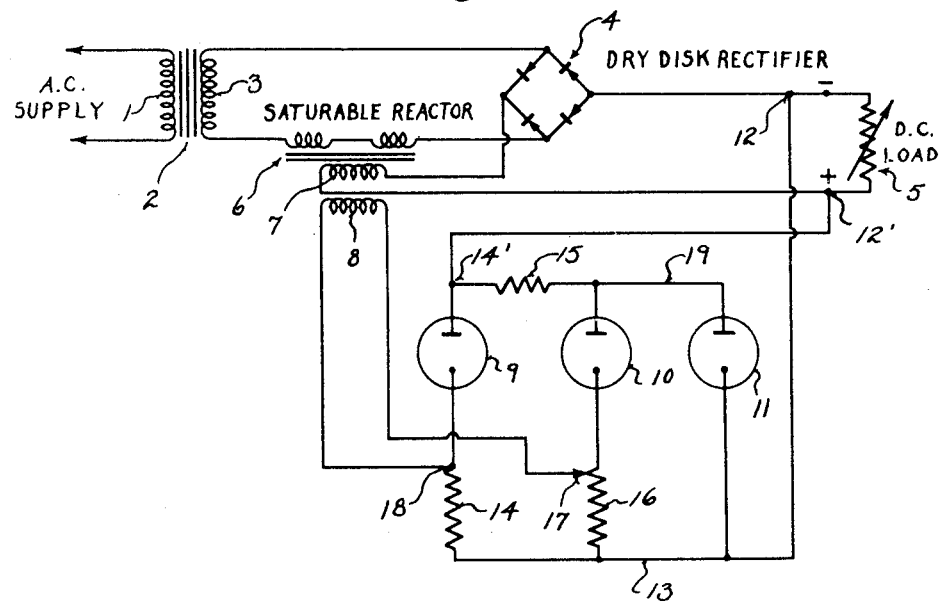
Figure 1 is a diagrammatic view showing the system of control where voltage regulator tubes directly control a saturable reactor.

Referring to Figure 1 showing the first form of the invention, it will be seen that the source of alternating current passes to the primary 1 of the transformer 2. The secondary 3 is designed to provide the requisite voltage. The alternating current passes to a rectifier preferably of the dry disk type and arranged in the form of a bridge as indicated by the reference character 4. The rectified direct current passes to a variable direct current load indicated generally by the reference character 5. A saturable reactor 6 is interposed between the secondary 3 and the rectifier 4. This saturable reactor is provided with a direct current series winding 7 connected in the direct current circuit as indicated and with a direct current control winding 8. The saturable reactor 6 is of the conventional type and is so constructed that no alternating current is induced in either of the coils 7 and 8. Three voltage regulator tubes indicated by the reference characters 9, 10, and 11 are connected in a network as shown in Figure 1. One side of this network is connected to the positive terminal 12' of the direct current load and the other side is connected to the negative terminal 12 of the direct current load. The negative terminal 12 is connected to a common conductor 13 and the positive terminal 12' is connected to the point 14' of the network and directly to the plate of the first voltage regulator tube 9. The cathode of the voltage regulator tube 9 is connected to the common conductor 13 through a resistor 14. A dropping resistor 15 is interposed between the plate of the second voltage regulator tube 10 and the point 14' and a resistor 16 is placed between the cathode of the second voltage regulator tube 10 and the common conductor or return 13. The third voltage regulator tube 11 has its plate connected to the plate of the tube 10 and its cathode connected to the common return or conductor 13.

The resistor 16 is in reality a potentiometer and the point 17 may be connected to any place along the resistor 16 so as to adjust the voltage between the common conductor 13 and the point 17. The ends of the winding 8 are connected to the point 18 and the point 17, and the adjustment, when the voltage between the points 12' and 12 is correct, is such that there is zero potential difference between the point 17 and the point 18.

The electronic devices 9, 10, and 11 may be of other types from that shown, but a very serviceable type has been found to be the gaseous voltage regulator type of tube. These tubes have a critical voltage at which discharge takes place.

The operation of the device is as follows:

Assume that the correct voltage exists between the points 12' and 12 across the direct current load. The adjustment of the point 17 is such that there is zero potential between the points 17 and 18 and consequently no current flows through the coil 8. If the voltage should rise even slightly across the direct current load, a discharge would occur through the tube 9 and there would be a drop in voltage across the resistor 14. The voltage across the resistor 16 would, however, remain constant since the drop across the resistor 15 leading to the plate of the tube 10 absorbs the increase in voltage. The tube 11 maintains the voltage between the conductor 19 and the common return 13 constant and thus it is apparent that the voltage across the resistor 16 remains constant. Therefore, there would be a flow of current through the coil 8 from the point 18 to the point 17 if there was a slight rise in voltage across the direct current load. This flow of current through the coil 8 decreases the effect of the series coil 7, the coil 7 it being noted acting in the manner of a magnetizing biasing member. The effect of the saturable reactor would, therefore, be increased and the voltage would be lowered at the direct current load to the desired value. On the other hand, if the voltage across the direct current load should drop even slightly below that for which the system is set, it is clear that the current flow through the coil 8 would be in a sense to aid the magnetization produced by the series coil or biasing coil 7 as the current, under these conditions, would now flow from the point 17 to the point 18. The effect of the saturable reactor would, therefore, be reduced and the voltage would be raised at the direct current load to the desired value.

Figure 2:
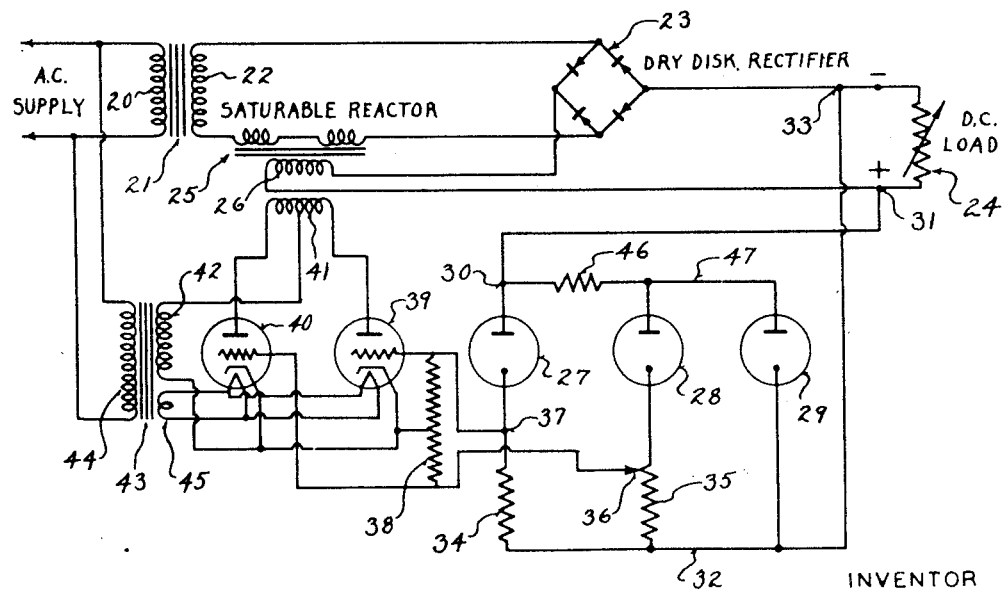
Figure 2 is a diagrammatic view showing the system of control where the regulator tubes control other electronic devices which, in turn, control the saturable reactor.

In the form of the invention shown in Figure 2, the alternating current supply passes through the primary 20 of the transformer 21. The secondary 22 thereof is connected to the bridge type of dry disk rectifier indicated generally at 23, such rectifier being, as in the previously described form of the invention, interposed between the alternating current supply and the variable direct current load indicated generally at 24. The biasing series coil for the saturable reactor indicated generally at 25 is indicated at 26 and is connected in series with the direct current load. Voltage regulator tubes 27, 28, and 29 are connected in a bridge circuit as previously described and the point 30 thereof is connected to the positive side or the point 31 of the direct current load. The common return 32 is connected to the negative side or the point 33 of the variable direct current load 24. The cathode of the tube 27 is connected to the common return 32 through a resistor 34 and the cathode of the voltage regulator tube 28 is connected to the common return 32 through a resistor 35. The resistor is of the potentiometer type so that the point 36 may be connected to the resistor 35 at any desired position to secure the requisite adjustment.

As described for the first form of the invention the control of the saturable reactor is obtained by the difference in voltage between the points 36 and 37. These points 36 and 37 are connected across a bridging resistor 38 whose approximate central point is connected to the cathodes of a pair of thyratrons 39 and 40 or other electron discharge devices. The plates of the thyratrons 39 and 40 are connected to opposite sides of the coil 41 of the saturable reactor. The center point of this coil is connected to one side of the secondary 42 of a transformer 43 whose primary 44 is connected across the alternating current source. The other side of the secondary 42 is connected to the cathodes of the thyratrons 39 and 40. A suitable heater winding 45 is provided for the thyratrons.

The operation of this system is as follows:

When the voltage across the direct current load 24 is correct, the point 36 is adjusted so that the thyratrons 39 and 40 have no influence on the saturable reactor. However, assume that there is a slight increase in voltage across the direct current load. This will cause the voltage at the point 37 to rise above the voltage at the point 36 as the voltage at the point 36 remains constant as previously described. If any variation in voltage between the point 30 and conductor 32 occurs, this variation appears as a voltage drop across the resistor 46. The tube 29 insures a constant voltage between the conductor 47 and the common return 32 as previously described. Under the conditions described above, the thyratron 39 will operate and will cause a current to flow through the control coil 41 through the saturable reactor in a direction to reduce the effect of the biasing or series coil 26 and to thus lower the value of the alternating current voltage impressed on the rectifier 23 and consequently lower the direct current voltage on the direct current load to its predetermined value. On the other hand, if the voltage across the direct current load should drop slightly, the current flow would be from the point 36 to the point 37 and the thyratron 40 would function to cause a current to flow in the control coil 41 in a direction to enhance the effect of the biasing or series coil 26 of the reactor and to thus cause the reactor to have a lesser effect and to thus cause the alternating current voltage impressed on the rectifier 23 to rise and, in turn, cause a rise in voltage across the direct current load 24 to bring it back to the predetermined value.

In both forms of the invention shown in Figures 1 and 2 the control is through the agency of electronic means which, in turn, control a saturable reactor. In the form shown in Figure 1, the voltage regulator tubes directly control the saturable reactor, whereas in the form shown in Figure 2, the voltage regulator tubes control the saturable reactor indirectly through the agency of thyratrons or other suitable types of electronic devices.

It is to be noted in connection with Figure 2 that the thyratrons 39 and 40 provide half wave rectification. However, as will be shown as the description proceeds, it is possible to secure full wave rectification and consequently better operation by using a pair of thyratrons or similar devices in place of each of the individual thyratrons 39 and 40. This is shown in Figures 3 and 4 which will be described hereinbelow.

In Figures 3 and 4 the constant voltage against which the direct current load voltage is balanced is provided as a separate voltage and is not obtained from the voltage across the direct current load as in Figures 1 and 2.

In Figure 3 the alternating current supply or source is indicated by the reference character 48. A transformer 49 is interposed between the rectifier 50 and the source of alternating current supply to secure the desired voltage. Also a saturable reactor 51 is interposed between the alternating current supply and the rectifier. The direct current load is indicated at 52 and the series coil or biasing winding for the saturable reactor is indicated at 53. The saturable reactor is also provided with a control winding 54 as previously described.

A resistor 55 is bridged across the direct current load and is of the potentiometer type with an adjustable point or contact 56. A transformer indicated generally by the reference character 57 has its primary connected across the alternating current supply. It has a plurality of secondaries, one of which indicated at 58 has its opposite ends connected to the plates of a full wave rectifier 59, the filament or cathode thereof being separately energized as shown. The center point of the winding 58 is connected to the negative conductor 60. One side of the cathode of the rectifier 59 is connected to one side of a choke 61. The other side of the choke is connected to the point 62. A smoothing condenser 63 is bridged between the point 62 and the conductor 60. A voltage regulator tube 64 has its cathode connected to the conductor 60 and its plate connected to the point 65, a dropping resistor 66 being positioned between the points 62 and 65. A second voltage regulator tube 67 has its cathode connected to the conductor 60 at its plate connected to the point 68, a dropping resistor 69 being interposed between points 65 and 68. From this arrangement, it is clear that the voltage between the point 68 and the conductor 60 is a constant voltage. This voltage is balanced against a portion of the voltage across the direct current load 52 as is apparent from the following:

The adjustable contact 56 of the potentiometer 55 is connected to one side of a bridging resistor 70, namely, to the point 71. The point 68 is connected to the other side of the bridging resistor 70, namely, to the point 72. The center point of the resistor 70 is connected to the cathode of two pairs of thyratrons. One pair of thyratrons is indicated generally by the reference character 73 and the other pair of thyratrons is indicated generally by the reference character 74. The pairs of thyratrons 73 and 74 are respectively supplied from the secondaries 75 and 76 of the transformer 57, a suitable winding being provided for energizing the filaments of the several thyratrons. The secondaries 75 and 76 are center tapped and are connected to opposite sides to a control coil or winding 54 of the saturable reactor 51. The center tap of the winding 54 is connected to the cathodes of all of the thyratrons. The operation of this system is as follows:

The contact 56 of the potentiometer 55 is adjusted so as to balance a fraction of the voltage across the direct current load against the constant voltage between the conductor 60 and the point 68. If there is a slight increase in voltage at the direct current load, the point 71 of the dropping resistor 70 will be positive with reference to the point 72. Consequently, the pair of thyratrons 73 will function and cause a current to flow through the control winding 54 in a sense or direction to counteract a portion of the effect of the biasing series winding 53. This will cause the saturable reactor to have a greater effect and consequently to reduce the alternating current voltage supplied the rectifier 50 and consequently to reduce the direct current voltage to the direct current load. On the other hand, if the voltage across the direct current load should drop, the point 72 of the dropping resistor 70 will be positive with reference to the point 71 and the pair of thyratrons 74 will function to cause a current to flow through the control coil 54 of the saturable reactor in a sense or direction to aid the effect produced by the series of biasing coil 53. This will cause the saturable reactor to have a lesser effect on the alternating current voltage supplied the rectifier with a consequent rise in alternating current voltage at the rectifier which, in turn, is shown as an increase in voltage at the direct current load.

Thus it is clear that the voltage at the direct current load is kept constant and any fluctuation in alternating current supply voltage will be corrected as well as any variation which would tend to result from a change in value of the resistance of the direct current load.

The system of control shown in Figure 3 is particularly suitable where there is a high direct current voltage impressed on the direct current load. In this system only a fraction of the load voltage is balanced against the constant voltage. On the other hand, Figure 4 is particularly suitable for a relatively lower voltage on the direct current load.

Referring to Figure 4, it will be seen that the system disclosed in such figure is very much like that shown in Figure 3 and wherever the circuits or parts are the same, the same reference characters will be used and the detailed description of such parts will not be repeated.

In Figure 4 the relatively lower direct current voltage at the direct current load is balanced against a portion only of the constant voltage between the conductor 60 and the point 68. This is accomplished by providing a resistor 77 of the potentiometer type bridge across the conductor 60 and the point 68. It is provided with an adjustable contact or point 78, which is connected to the end or point 72 of the bridging resistor 70. The other side of the bridging resistor 70, namely, the point 71 is connected to the positive side of the direct current load. The conductor 60 is connected to the negative side of the direct current load. A slight rise in voltage at the direct current load will cause the point 71 to be positive with reference to the point 72 of the bridging resistor 70. Consequently, the thyratrons 73 will function and will cause a current to flow through the control coil 54 of the saturable reactor in a sense or direction to neutralize a portion of the effect of the biasing series coil 53. On the other hand, if there is a slight drop in voltage across the direct current load, the point 72 of the bridging resistor 70 will be positive with reference to the point 71 and the thyratrons 74 will function to cause a flow of current through the control coil 54 of the saturable reactor in the same sense or direction as that in the biasing coil 53. This will cause the saturable reactor to have a lesser effect on the alternating current supplied the rectifier and consequently will cause a rise in voltage at the direct current load so as to bring the voltage back to its desired value.

Throughout the description hereinabove, it is stated that the automatic adjustment of any of the systems causes a rise or a dropping of the voltage at the direct current load. It is to be understood that these expressions are intended to signify that the voltage has been corrected at the direct current load to bring it to the desired constant value. In addition to this, where the expression constant voltage is employed, particularly at the direct current load, it is to be understood that this expression is intended to mean substantially constant voltage as there necessarily will be a very slight variation in voltage at the direct current load in order to cause the regulator systems to function. The change at the direct current load is, however, minute and, therefore, the expression constant voltage across the direct current load is employed.

It is to be understood also that other types of electronic means could be employed in place of the thyratrons, provided such devices have the requisite characteristics. Also it is to be understood that any suitable bias voltage can be impressed on the grids of the thyratrons. These features have been omitted from the disclosure for the purpose of simplifying the showing and description. In other words, it is to be understood that any of the usual or standard practices or any standard electronic devices can be employed where such practices or such devices fit in with the proper functioning of the systems as hereinabove described.

While the thyratrons or pairs of thyratrons have been described as functioning alternately depending on whether the voltage tended to rise or fall at the direct current load, it is to be understood that the thyratrons or pairs of thyratrons may function concurrently with one thyratron or one pair of thyratrons predominating as the case may be.

It is to be understood that the primary control of the saturable reactor in the several systems disclosed is obtained by the control or winding which is either directly or indirectly controlled by the voltage regulator tubes. However, there is a certain degree of control obtained through the action of the biasing of the series coil of the saturable reactor to compensate for increase in current flow at the direct current load with a consequent tendency for the voltage to drop at the direct current load. Thus there are two controls of the saturable reactor, namely, one the biasing or series coil, and the other the coil controlled through the agency of the electronic devices. Both of these controls function or operate in the right direction to compensate for any tendency towards voltage variation at the direct current load. In addition to this, the series coil of the saturable reactor furnishes a magnetic bias which is either increased or decreased through the action of the other control coil which, in turn, as stated is controlled through the action of the electronic devices.

In actual practice it has been found that a very high degree of control is obtained and that the voltage at the direct current load remains substantially constant with only a very minute variation. This substantially constant voltage at the direct current load is maintained either when the direct current load itself is varied on the one hand or when the alternating current supply voltage is varied on the other hand.

It will be seen also that the systems function automatically and instantly to maintain constant voltage at the direct current load.

Although this invention has been described in considerable detail, it is to be understood that such description is intended as illustrative rather than limiting, as the invention may be variously embodied and is to be interpreted as claimed.

I claim:

1. A system of regulation comprising a source of alternating current, a direct current load, a rectifier interposed between said source and said load, a saturable reactor arranged to control the alternating current voltage at said rectifier and including a direct current control coil, means magnetically biasing said saturable reactor and arranged to produce a partial magnetic bias, and means including voltage regulator tubes responsive to the voltage at said direct current load and arranged to cause a current to flow in one direction or in a reverse direction through said direct current control coil to respectively increase or decrease said partial magnetic bias to maintain a constant voltage at said direct current load.

2. A system of regulation comprising a source of alternating current, a direct current load, a rectifier interposed between said source and said load, a saturable reactor arranged to control the alternating current voltage at said rectifier, means magnetically biasing said saturable reactor and arranged to produce a partial magnetic bias, a network including voltage regulator tubes arranged to maintain a constant voltage at a first point and a variable voltage at a second point proportional to the voltage at the direct current load, and a control winding on said saturable reactor having opposite ends respectively connected to said first and second points of said network and arranged to aid the magnetic bias of said saturable reactor upon a slight drop in voltage at said direct current load and to oppose said magnetic bias upon a slight rise in voltage at said direct current load.

3. A system of regulation comprising a source of alternating current, a direct current load, a rectifier interposed between said source and said load, a saturable reactor arranged to control the alternating current voltage at said rectifier, means magnetically biasing said saturable reactor and arranged to produce a partial magnetic bias, a network including voltage regulator tubes arranged to maintain a constant voltage at a first point and a variable voltage at a second point proportional to the voltage at the direct current load, said saturable reactor having a control winding, and electron discharge means controlling the current flow through said control winding, said voltage regulator tubes being arranged to control said electron discharge devices in accordance with the difference in voltage at said points.

4. A system of regulation comprising a source of alternating current, a direct current load, a rectifier interposed between said source and said load, a saturable reactor arranged to control the alternating current voltage at said rectifier, means magnetically biasing said saturable reactor, said saturable reactor having a control winding, electron discharge means arranged to control both the value and direction of the current flow through said control winding, means for supplying a constant direct voltage, and means for balancing the said constant voltage against a part at least of the voltage at said load and for supplying the resulting difference in voltage as a control voltage to said electron discharge means.

HENRY G. MAH.

REFERENCES CITED

The following references are of record in the file of this patent:

UNITED STATES PATENTS

| Number | Name | Date |
|---|---|---|
| 1,963,093 | Logan | June 19, 1934 |
| 2,000,189 | Power | May 7, 1935 |
| 2,028,541 | Gilson | Jan. 21, 1936 |
| 2,207,259 | Koch | July 9, 1940 |
| 2,253,705 | Hedding et al. | Aug. 26, 1941 |
| 2,282,471 | Hedding | May 12, 1942 |
| 2,331,411 | Milarta | Oct. 12, 1943 |